US005910473A

United States Patent [19]
Alfano et al.

[11] Patent Number: 5,910,473

[45] Date of Patent: Jun. 8, 1999

[54] COLORED ACIDIC AQUEOUS LIQUID COMPOSITIONS COMPRISING A PEROXY-BLEACH

[75] Inventors: Stefano Alfano; Giulia Ottavia Bianchetti; Franca Fabri, all of Rome; Luigi Pace, Sorrento, all of Italy

[73] Assignee: The Procter & Gamble Company, Cincinnati, Ohio

[21] Appl. No.: 08/973,319

[22] PCT Filed: Apr. 19, 1996

[86] PCT No.: PCT/US96/05335

§ 371 Date: Mar. 23, 1998

§ 102(e) Date: Mar. 23, 1998

[87] PCT Pub. No.: WO96/83877

PCT Pub. Date: Dec. 5, 1996

[30] Foreign Application Priority Data

May 31, 1995 [EP] European Pat. Off. .............. 95870064

[51] Int. Cl.[6] ............................ C11D 3/39; C11D 3/395; C01B 15/055; C01B 15/08

[52] U.S. Cl. .......................... 510/191; 510/192; 510/373; 510/419; 252/186.25; 252/186.26; 252/186.27; 252/186.33

[58] Field of Search ......................... 252/186.25, 186.26, 252/186.27, 186.33; 510/191, 192, 372, 373, 419

[56] References Cited

U.S. PATENT DOCUMENTS

| | | | |
|---|---|---|---|
| 3,970,575 | 7/1976 | Barrett, Jr. | 252/186.29 |
| 4,033,718 | 7/1977 | Holcombe et al. | 8/103 |
| 4,338,204 | 7/1982 | Spadini et al. | 510/301 |
| 4,666,622 | 5/1987 | Martin et al. | 252/186.43 |
| 4,900,469 | 2/1990 | Farr et al. | 252/186.26 |
| 5,078,896 | 1/1992 | Roniq et al. | 510/372 |
| 5,462,689 | 10/1995 | Choy et al. | 134/34 |
| 5,505,873 | 4/1996 | Akabane et al. | 134/2 |
| 5,728,665 | 3/1998 | Choy et al. | 510/373 |

FOREIGN PATENT DOCUMENTS 0 601 792 A1 6/1994 European Pat. Off. .

*Primary Examiner*—Joseph D. Anthony
*Attorney, Agent, or Firm*—Robert B. Aylor

[57] ABSTRACT

This invention relates to colored acidic thickened aqueous compositions comprising a source of peroxygen and from 0.002% to 0.05% by weight of the total composition of an α or β metal phthalocyanine dye, or mixtures thereof. Preferred compositions therein comprise a thickening surfactant system such as a quaternary ammonium compound together with a short chain amine oxide. Said compositions are particularly suitable for the cleaning of toilet bowls providing enhanced perceived viscosity by the consumer and enhanced ease of rinsing perceived by the consumer.

14 Claims, No Drawings

COLORED ACIDIC AQUEOUS LIQUID COMPOSITIONS COMPRISING A PEROXY-BLEACH

This application is a 371 of PCT/US96/05335 filed Apr. 19, 1996.

TECHNICAL FIELD

The present invention relates to colored acidic thickened aqueous liquid compositions, more particularly to acidic thickened aqueous compositions comprising a source of active oxygen and a given dye at a given level. Said compositions find particular application in the cleaning of hard-surfaces, especially inclined hard-surfaces, such as toilet bowls and the like.

BACKGROUND

A great variety of bleaching and cleaning compositions have been described in the art. Bleaching/cleaning compositions comprising a source of active oxygen and formulated at low pH are particularly interesting for the cleaning of hard-surfaces, especially for the hygienic cleaning of sanitary fittings such as toilet bowls and the like.

European co-pending application 94870184.2 discloses acidic thickened aqueous compositions comprising persulfate salts and as the thickening system a quaternary ammonium compound together with a short chain amine oxide (C6 to C10).

It is desirable to formulate acidic compositions comprising a source of active oxygen such as persulfate salts with an adequate viscosity, so that said compositions have a consumer acceptable residence time on the surface to be cleaned. In other words, it is desired from a consumer point of view to provide compositions having greater residence time on non-horizontal surfaces such as inclined wall of a toilet bowl when applied thereto, allowing thereby that said compositions perform their cleaning action for longer periods of time. It has now been found that the consumer perception of the viscosity of a given thickened composition applied onto a non-horizontal surface is driven not only by the real viscosity of said composition per se but even by the level of dye present in said composition. Indeed, it has been observed that the higher the dye level, the thicker the composition is perceived by the consumer when applied on a non-horizontal surface like toilet bowls.

It is further desirable that such compositions be easily rinsed away from said surfaces, especially because viscous products have a good cling onto said surfaces. We have now found that the consumer perception of the rinsing of a given thickened composition applied onto a non-horizontal surface like toilet bowls, is driven not only by the real amount of said composition that remains onto said surface after having being rinsed away for example by flushing, but also by the level of dye present in said composition. It has been observed that the higher the dye level, the more product is perceived by the consumer to remain on said surface after flushing, which is detrimental from a consumer point of view.

It is thus an object of the present invention to formulate colored acidic thickened aqueous compositions comprising a source of active oxygen and a dye, said compositions being perceived concomitantly as being more viscous and easy to rinse away from a consumer standpoint.

Also, when formulating colored acidic aqueous compositions, which comprise a source of active oxygen such as monopersulfate salts, stability problems appear, i.e., in general peroxy-bleaches raise compatibility issues in relation with the kind of dyes used and the levels of dyes because dyes themselves and/or the metals present in the dyes may catalyse the peroxide decomposition.

It is thus also an object of the present invention to provide a colored acidic thickened aqueous composition comprising a source of active oxygen, in particularly a persulfate salt, which is chemically stable.

It has now been found that the above mentioned objects could be met by formulating acidic thickened aqueous compositions comprising a source of active oxygen with a dye which is chemically and physically stable in said medium, i.e., an α or β metal phthalocyanine dye, or mixtures thereof at optimised levels. Indeed, it has been found that by carefully defining the level of said α or β metal phthalocyanine dye, or mixtures thereof, compositions are perceived thicker by the consumer while being also easily rinsed away from a non-horizontal surface after having been applied thereto. In other words, the present invention allows to provide colored acidic thickened aqueous compositions which are perceived by the consumer as being more viscous, without increasing the total level of thickening ingredients present in said compositions such as surfactants. Also the present invention allows to optimise the rinsing perception by the consumer of colored acidic thickened aqueous compositions without decreasing the real viscosity of said compositions and/or modifying the hydrophilicity/lipophilicity balance (HLB) of said compositions.

An advantage of the compositions of the present invention is that said compositions are chemically stable for long storage periods. Indeed, by carefully defining the level of α or β metal phthalocyanine dyes, or mixtures thereof, chemically stable colored acidic aqueous compositions are provided.

A further advantage of the present invention is that said colored acidic thickened aqueous compositions are efficient on various surfaces to clean various soils and stains. Additionally, said compositions when used to treat hard surfaces, especially toilet bowls, exhibit outstanding soil discoloration, soil solubilization, removal and emulsification properties together with a germicidal action, this when used both neat or diluted.

Also, the preferred thickened compositions of the present invention which comprise a thickening surfactant system comprising quaternary ammonium compound and short chain amine oxide (C6–C10), exhibit improved thickening properties at low total thickening surfactant level.

The following patent applications are representative of the prior art.

EP-A-265 979 discloses acidic thickened aqueous cleaning compositions comprising a disinfecting and/or oxidising agent, an organic anionic sulphonate and a surfactant selected from the group of (1) quaternary ammonium compounds wherein at least one of the hydrocarbon groups linked to the nitrogen is a linear or branched alkyl group containing at least 12 carbon atoms and of (2) tertiary amine oxides wherein at least one of the hydrocarbon groups linked to the nitrogen is a linear or branched alkyl group containing at least 16 carbon atoms. Nowhere in EP-A-265 979 a source of active oxygen is disclosed. The composition in example 1 comprises a dye at a level of 0.001% by weight.

EP-A-188 025 discloses aqueous stable thickened low-pH bleaching compositions comprising an inorganic peroxy compound, a strong acid and a thickening surfactant. Dyes are mentioned in general. The examples comprise Latex red 41R, or Latex blue 842103 which are not α or β metal phthalocyanine dyes.

EP-A-601 792 discloses thickened aqueous toilet cleaning compositions comprising an acidic limescale removing agent, hydrogen peroxide, one or more thickeners and up to 1.5% by weight of a colorant. The composition exemplified comprises Unisperse green® which is a chlorinated copper phthalocyanine dye at a level of 0.0045% by weight. No reference is made to the finding of the present invention, the existence of optimised levels of α or β metal phthalocyanine dyes which enable to have excellent perceived viscosity and excellent perceived ease of rinsing without compromising peroxy-bleach stability.

SUMMARY OF THE INVENTION

The present invention encompasses a colored acidic thickened aqueous composition having a viscosity of from 150 cps and up at 20° C. and comprising a source of active oxygen, or mixtures thereof and from 0.005% to 0.02% by weight of the total composition of an α or β metal phthalocyanine dye, or mixtures thereof.

The present invention also encompasses a process of treating a hard-surface, especially toilet bowls, wherein a colored acidic thickened aqueous composition as mentioned herein before, is used.

DETAILED DESCRIPTION OF THE INVENTION

The compositions of the present invention are colored acidic thickened aqueous liquid compositions comprising, as an essential ingredient, a source of active oxygen, or mixtures thereof, which is an acid-stable bleach. By "acid-stable" it is meant herein a compound which is stable in the acidic environment of the compositions herein. By stable, it is meant herein that a composition of the present invention comprising a source of active oxygen, or mixtures thereof, such as persulfate salt, preferably does not undergo more than 50% persulfate loss, in six months at room temperature (20° C.–25° C.). Persulfate concentration can be measured by titration with potassium permanganate after reduction with a solution containing ammonium ferrous sulphate. Said stability test method is well known in the art and is reported, for example, on the technical information sheet of Curox® commercially available from Interox. Best way to measure persulfate concentration is by using a chromatography method described in the literature for peracids (F. Di Furia et al., Gas-liquid Chromatography Method for Determination of Peracids, Analyst, Vol 113, May 1988, p 793–795).

The source of active oxygen according to the present invention acts as an oxidising agent, it increases the ability of the compositions to remove colored stains and organic stains in general, to destroy malodorous molecules and to kill germs. Suitable sources of active oxygen are hydrogen peroxide or sources thereof. As used herein a hydrogen peroxide source refers to any compound which produces hydrogen peroxide when said compound is in contact with water. Suitable water-soluble inorganic sources of hydrogen peroxide for use herein include persulfate salts (i.e., dipersulfate and monopersulfate salts), persulfuric acid, percarbonates, metal peroxides, perborates and persilicate salts.

In addition, other classes of peroxides can be used as an alternative to hydrogen peroxide and sources thereof or in combination with hydrogen peroxide and sources thereof. Suitable classes include dialkylperoxides, diacylperoxide, performed percarboxylic acids, organic and inorganic peroxides and/or hydroperoxides. Suitable organic peroxides/hydroperoxides include diacyl and dialkyl peroxides/hydroperoxides such as dibenzoyl peroxide, t-butyl hydroperoxide, dilauroyl peroxide, dicumyl peroxide, and mixtures thereof. Suitable preformed peroxyacids for use in the compositions according to the present invention include diperoxydodecandioic acid DPDA, magnesium perphthalic acid, perlauric acid, perbenzoic acid, diperoxyazelaic acid and mixtures thereof.

Persulfate salts, or mixtures thereof, are the preferred sources of active oxygen to be used in the compositions according to the present invention. Preferred persulfate salt to be used herein is the monopersulfate triple salt. One example of monopersulfate salt commercially available is potassium monopersulfate commercialised by Peroxide Chemie GMBH under the trade name Curox®, by Degussa under the trade name Caroat and from Du Pont under the trade name Oxone. Other persulfate salts such as dipersulfate salts commercially available from Peroxide Chemie GMBH can be used in the compositions according to the present invention.

The compositions according to the present invention may comprise up to 30% by weight of the total composition of said source of active oxygen, or mixtures thereof, preferably from 0.1% to 30%, more preferably from 0.1% to 20%, and most preferably from 0.1% to 15%.

The compositions of the present invention are thickened compositions. Accordingly the compositions of the present invention have a viscosity of from 150 cps and up at 20° C., preferably of from 250 cps to 1500 cps and more preferably of from 250 cps to 900 cps, when measured with a Brookfield viscometer at 60 rpm with a spindle n° 2 or with the Carri-med rheometer at 50 dyne/cm2.

Any surfactant system known in the art to increase the viscosity of a composition can be used herein, and that is desirable since the compositions herein are likely to be used on inclined surfaces such as bath tubs, sinks or toilet bowls. Thickened compositions have a better cling onto inclined surfaces, thus a longer residence time for the composition to remove mineral encrustations.

Thus the surfactants suitable to be used in the compositions of the present invention may be thickening surfactants such as anionic, nonionic, zwitterionic and cationic surfactants in amount up to 50% by weight of the total composition.

Suitable anionic surfactants include alkyl or alkylene sulfate or sulfonates, alkyl or alkylene ether sulfates or sulfonates, linear alkyl benzene sulfonate and the like. Suitable cationic surfactants include quaternary ammonium salts. Suitable nonionic surfactants for use herein include ethoxylated carboxylic acids, amine oxides and alcohol ethoxylates. Emulsions of nonionic surfactants, such as in co-pending European patent application EP 598 692, are also suitable to provide pseudoplastic and thixotropic compositions, which allow excellent spreading and clinging characteristics on dry surfaces.

A suitable thickening surfactant system highly preferred herein that leads to excellent spreading and clinging on wet surface, is constituted by mixtures of a quaternary ammonium compound, or mixtures thereof, together with a short chain amine oxide, or mixtures thereof. Said compositions are Newtonian. By "Newtonian" it is meant herein a composition which has the same viscosity within a very wide range of applied shear stresses. Said thickening surfactant system comprising a quaternary ammonium compound, or mixtures thereof, together with a short chain amine oxide, or mixtures thereof, allows to use low levels of total thickening surfactant to achieve a given viscosity for a colored acidic aqueous composition comprising a source of active oxygen. In other words, to obtain a desired thickening effect for a given colored acidic aqueous composition, a lower level of total thickening surfactants (quaternary ammonium compounds and short chain amine oxides) is sufficient, as compared to the level of quaternary ammonium compound which would otherwise be required to obtain the same thickening effect when used alone, in absence of any short chain amine oxide.

Suitable quaternary ammonium compounds to be used herein are quaternary ammonium compounds wherein one or two of the hydrocarbon groups linked to nitrogen are a linear or branched alkyl group of 6 to 30 carbon atoms, preferably of 10 to 25 carbon atoms and more preferably 12 to 20 carbon atoms, saturated or unsaturated, and wherein the other hydrocarbon groups (i.e. three when one hydrocarbon group is a long chain hydrocarbon group as mentioned hereinbefore or two when two hydrocarbon groups are long chain hydrocarbon groups as mentioned hereinbefore) linked to the nitrogen are independently substituted or unsubstituted, linear or branched, alkyl chain of from 1 to 4 carbon atoms, preferably of from 1 to 3 carbon atoms and more preferably are methyl groups. In the embodiment of the present invention where persulfate salts or mixtures thereof are used as the source of active oxygen, the quaternary ammonium compound is preferably a non-chloride quaternary ammonium compound. The counterion used in said quaternary ammonium compounds are compatible with any source of active oxygen and are selected from the group of fluoride or methyl sulfate, or methylsulfonate, or hydroxide and the like. Particularly preferred to be used herein are trimethyl quaternary ammonium compounds like myristyl trimethyl ammonium methylsulfate, cetyl trimethyl ammonium methylsulfate and/or tallow trimethyl ammonium methylsulfate. Such trimethyl quaternary ammonium compounds are commercially available from Hoechst or from Albright & Wilson under the trade name EMPIGEN CM®.

The compositions according to the present invention comprise up to 20% by weight of a quaternary ammonium compound, or mixtures thereof, preferably of from 0.1% to 15%, more preferably of from 0.1% to 10% and most preferably of from 1% to 5%.

Suitable short chain amine oxides to be used herein are amine oxides having the following formula $R_1R_2R_3NO$ wherein R1 is a C6 to C10 alkyl group, preferably a C8 to C10 alkyl group and wherein R2 and R3 are independently substituted or unsubstituted, linear or branched alkyl groups of from 1 to 4 carbon atoms, preferably of from 1 to 3 carbon atoms and more preferably are methyl groups. R1 may be a linear or branched alkyl group, being saturated or unsaturated. Suitable short chain amine oxides for use herein are preferably compatible with any source of active oxygen. Preferred short chain amine oxides for use herein are for instance natural blend C8/C10 amine oxide available from Hoechst.

The compositions according to the present invention comprise up to 15% by weight of a short chain amine oxide, or mixtures thereof, preferably of from 0.1% to 10% more preferably of from 0.1% to 5% and most preferably of from 0.1% to 3%.

The total level of thickening surfactant system, i.e. of quaternary ammonium compound and of short chain amine oxide, to be used in a given aqueous acidic composition of the present invention depends on the thickening desired for said composition, said level being up to 20%, preferably between 1% and 15%, more preferably between 1% and 10% and most preferably between 1% and 6%. Suitable weight ratios of said short chain amine oxide to said quaternary ammonium compound range from 1:2 to 1:100, preferably from 1:4 to 1:30 and more preferably from 1:10 to 1:20.

The compositions of the present invention are colored acidic thickened aqueous compositions comprising as an essential ingredient an α or β metal phthalocyanine dye, or mixtures thereof.

Suitable α or β metal phthalocyanine dyes to be used herein are acid-stable and bleach-stable dyes. By "acid-stable" it is meant herein a compound which is chemically and physically stable in the acidic environment of the compositions herein. By "bleach-stable" it is meant herein a compound which is chemically and physically stable in presence of bleaches. The α or β metal phthalocyanine dyes suitable to be used in the compositions of the present invention are light-fast organic pigments with four isoindole groups, $(C_6H_4)C_2N$, linked by four nitrogen atoms to form a conjugated chain. Their general structure is the following:

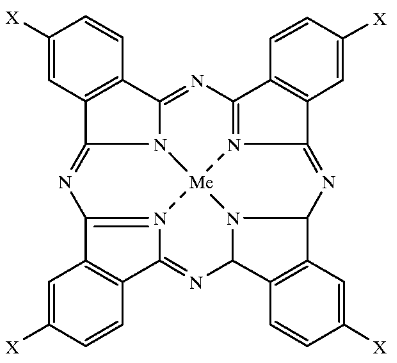

where the substituent X may be one of the following groups: H, Cl, $HSO_3$, COO—M+, Br, $NO_2$, $OCH_3$ or a $C_1$ to $C_{10}$ alkyl group and where Me is copper, chromium, vanadium, magnesium, nickel, platinum, aluminium, cobalt, lead, barium or zinc. Preferred α or β metal phthalocyanine dyes to be used herein are α or β copper phthalocyanine dyes.

Examples of such a copper phthalocyanine dyes to be used herein are copper phthalocyanine (X=H, blue colour) commercially available under the name UNISPERSE Blue B-E® from Ciba-Geigy, or copper phthalocyanine (X=H, blue colour) commercially available under the name Cosmenyl blue A2R® from Hoechst, or chlorinated copper phthalocyanine (X=Cl, green colour) commercially available under the name Pigmosol Green 8730® from BASF.

Optimum level of α or β metal phthalocyanine dye depends on the kind of dye or mixtures thereof to be used herein. By "optimum level" it is meant herein the level of α or β metal phthalocyanine dye, or mixtures thereof, which enables to have both excellent perceived viscosity and excellent perceived ease of rinsing by the consumer, without compromising peroxy-bleach stability. Accordingly, the compositions of the present invention comprise from 0.005% to 0.02% by weight of the total composition of α or β metal phthalocyanine dye, or mixtures thereof, preferably from 0.006% to 0.015% and more preferably from 0.006% to 0.012%. Indeed, the present invention is based on the finding that by carefully defining the level of said α or β metal phthalocyanine dye, or mixtures thereof, colored acidic thickened aqueous compositions are provided which (1) are perceived as being more viscous by the consumer, without increasing the total level of thickening ingredients present in said compositions and (2) are perceived by the consumer as being easily rinsed away from a non-horizontal surface after having been applied thereto without decreasing the real viscosity of said compositions and/or modifying the hydrophilicity/lipophylicity balance (HLB) of said compositions, this without compromising peroxy-bleach stability.

The compositions of the present invention are acidic. Accordingly, the compositions herein are formulated at a pH between 0 to 6, preferably at a pH between 0 and 4 and more preferably at a pH between 0 and 2. Acidity further contributes to formulate compositions according to the present invention which exhibit good mineral encrustations removal performance while having also good disinfecting properties. The compositions of the present invention comprise organic and/or inorganic acids. Particularly suitable organic acids to be used herein are aryl and/or alkyl sulfonate, such as methane sulfonic acids, succinic acid, sulphamic acid and the like. Particularly suitable inorganic acids to be used herein are sulphuric acid, phosphoric acid, nitric acid and the like and preferably sulphuric acid.

The compositions according to the present invention are aqueous. The compositions according to the present invention comprise from 40% to 99% by weight of the total composition of water, preferably from 60% to 95%, most preferably from 70% to 90%. Deionized water is preferably used.

Depending on the end use envisioned, the compositions according to the present invention may further comprise a variety of other ingredients including organic or inorganic alkalis, optical brighteners, builders, chelants, pigments, colorants, enzymes, dye transfer inhibitors, solvents, buffering agents, stabilisers, perfumes and the like.

Any chelating agent known in the art may be used herein. Preferred chelating agents to be used herein are the ones having a pKa being not higher than 4, such as phosphonate-based chelants having a number of phosphonate groups ranging from 1 to 6 and being preferably selected from the following group, or mixtures thereof: amino poly alkyl phosphonic acids, metaphosphoric acid $(HPO_3)_n$, pyrophosphoric acid $(H_4P_2O_7)$, methylidene di phosphonic acid $CH_2(H_2PO_3)_2$. Suitable amino poly alkyl phosphonic acids are diethylenetriamine penta methylene phosphonic acid, commercially available from Monsanto under the trade name Dequest® 2066A; amino trimethylene phosphonic acid commercially available from Albright&Wilson under the trade name Briquest®301-50A; tetraethylene pentaamine hepta methylene phosphonic acid commercially available from Albright&Wilson under the trade name Briquest® 785; pentaethylene hexaamine octa methylene phosphonic acid commercially available from Albright&Wilson under the trade name Briquest® 8106. Preferred amino poly alkyl phosphonic acid to be used herein is diethylenetriamine penta methylene phosphonic acid. Metaphosphoric acid and pyrophosphoric acid suitable to be used herein may be the ones commercially available from Carlo Erba. The addition of such chelating agents in the colored acidic thickened aqueous compositions of the present invention, where the acid is sulfuric acid, allows to inhibit the formation and subsequent precipitation of calcium sulfate, when the compositions are applied on inorganic soils like calcium carbonate or calcium phosphonate encrustations commonly found in hard-surfaces, like toilets bowls, resulting thereby in improved surface appearance (i.e., better shine and/or cleaning performance).

The present invention further encompasses a process of treating a hard-surface wherein a colored acidic thickened aqueous composition as described herein before, is used.

In the process of the present invention said composition may be used neat or in its diluted form. By "in its diluted form" it is meant herein that said compositions may be diluted with water up to 99% of water. Said dilution may occur either before, after or while said composition is applied to a hard-surface.

The compositions herein find a preferred application in the cleaning of toilet bowls and bath tubs. While cleaning toilet bowls compositions according to the present invention may be diluted while or after they are applied to the surface to be cleaned. For example, said compositions may be dispensed from a container onto said hard-surface, then diluted in water and left to act onto said surfaces, then removed by rinsing or flushing.

As used in the foregoing paragraphs, the expression "treating" includes bleaching as the compositions of the present invention comprise a source of active oxygen, preferably persulfate salts, removal of mineral encrustations as the compositions used in the process according to the present invention comprise acids, and/or washing as the compositions used in the process according to the present invention may further comprise surfactants.

The present invention is further illustrated by the following examples.

Experimental Data

Compositions are made which comprise the listed ingredients in the listed proportions (weight %).

| Compositions (% by weight) | #1 | #2 | #3 |
|---|---|---|---|
| Sulphuric acid | 6 | 6 | 6 |
| *Curox ® | 6 | 6 | 6 |
| C16 trimethyl ammonium methylsulfate | 3.5 | 3.5 | 3.5 |
| C8/C10 amine oxides | 0.3 | 0.3 | 0.3 |
| Diethylene triamine penta (methylene phosphonic acid) | 0.1 | 0.1 | 0.1 |
| **Unisperse blue B–E ® | 0.003 | 0.009 | 0.015 |
| Water and minors | | up to 100 | |
| pH | 0.5 | 0.5 | 0.5 |
| viscosity (m Pa s) | 350 | 350 | 350 |

*Curox ® is one of the commercial names of monopersulfate salts.
**Unisperse blue B–E ® is an α copper phthalocyanine dye of the formula as described herein before where X is H and is commercially available from Ciba-Geigy.

According to the present invention for each of the α or β metal phthalocyanine dye or mixtures thereof to be used in a colored acidic thickened aqueous liquid composition there is an optimum level which enables to have excellent perceived viscosity and excellent perceived ease of rinsing by the consumer without compromising peroxy-bleach stability.

Composition #1 is taken as the reference. Composition #2 is representative of the present invention, it comprises α copper phthalocyanine dye of the formula as described herein before where X is H at its optimum level, i.e., 0.009% by weight of the total composition. Composition #3 comprises α copper phthalocyanine dye of the formula as described herein before where X is H at a level of 0.015% by weight of the total composition.

A) The above compositions were evaluated for their perceived viscosity and perceived ease of rinsing by 30 panelists, i.e., the panelists were asked to compare compositions #2 and #3 to the reference composition, i.e. composition #1, and to judge which composition was thicker (higher perceived viscosity) and which composition was more easily rinsed away from the surface to which it has been previously applied. This test was performed on inclined surfaces (toilet bowl). The compositions were applied neat, left to act for 5 minutes and then rinsed away by flushing.

The results were as following:

| Compositions | #1 | #2 | #3 |
|---|---|---|---|
| Perceived viscosity | reference | higher | much higher |
| Perceived ease of rinsing | reference | equal | much worse |
| Overall preference | reference | better | worse |

B) Above compositions #1, #2 and #3 were further evaluated to asses the stability of the persulfate salts in said compositions over long periods of time. The stability test used was an accelerated storage test where the above compositions were left for 3 days at 50° C. This accelerated storage test corresponds to 3 months storage at room temperature, i.e., about 25° C.

In this test persulfate concentration was measured using a chromatography method described in the literature for peracids (F. Di Furia et al., Gas-liquid Chromatography Method for Determination of Peracids, Analyst, Vol 113, May 1988, p 793–795).

The results were as following:

| Compositions | #1 | #2 | #3 |
|---|---|---|---|
| Persulfate loss (%) 3 days at 50° C. | 23 | 22 | 41 |

Accordingly, it has been observed that there is an acidic thickened aqueous composition containing a source of active oxygen and an α or β metal phthalocyanine dye or mixtures thereof, for which an optimum balance is obtained between perceived viscosity, perceived ease of rinsing and persulfate stability. Indeed, the optimum level of dye, when the dye is α copper phthalocyanine dye of the formula as described herein before where X is H (Unisperse blue B-E®), is 0.009% by weight of the total composition.

EXAMPLES

The following composition further illustrates the present invention. The composition is made with the listed ingredients in the listed proportions (weight %).

| Compositions (% by weight) | #1 |
|---|---|
| Sulphuric acid | 6 |
| *Curox ® | 6 |
| C16 trimethyl ammonium methylsulfate | 3.5 |
| C8/C10 amine oxides | 0.3 |
| Diethylene triamine penta (methylene phosphonic acid) | 0.1 |
| **Pigmosol Green 8730 ® | 0.01 |
| Water and minors | up to 100 |

-continued

| Compositions (% by weight) | #1 |
|---|---|
| pH | 0.5 |
| viscosity (m Pa s) | 350 |

*Curox ® is one of the commercial names of monopersulfate salts.
**Pigmosol Green 8730 is an α copper phthalocyanine dye of the formula as described herein before where X is Cl and is commercially available from BASF.

The above mentioned colored acidic thickened aqueous composition provides excellent perceived viscosity, excellent perceived ease of rinsing without compromising peroxy-bleach stability.

We claim:

1. A colored acidic thickened aqueous composition having a viscosity of from 150 cps and up at 20° C., when measured with a Carri-med rheometer at 50 dyne/cm2, said aqueous composition comprising a source of peroxygen and from 0.005% to 0.02% by weight of the total composition of an α or β metal phthalocyanine dye, or mixtures thereof; wherein said aqueous composition further comprises a thickening surfactant system comprising (a) a quaternary ammonium compound wherein one or two of the hydrocarbon groups linked to nitrogen are a linear or branched alkyl group of about 6 to about 30 carbon atoms, saturated or unsaturated, and wherein the other hydrocarbon groups lined to the nitrogen are independently substituted or unsubstituted, linear or branched alkyl chain of from 1 to about 4 carbon atoms, and wherein the counterion used in said quaternary ammonium compound is selected from the group of fluoride, or methyl sulfate, or methylsulfonate or hydroxide, or mixtures thereof, and (b) an amine oxide having the following formula $R_1R_2R_3NO$ wherein $R_2$ and $R_3$ are independently C1–C4 alkyl groups, and wherein $R_1$ is C6 to C10 alkyl group, or mixtures thereof; and wherein the weight ratio of said amine oxide to said quaternary ammonium compound is from about 1:2 to about 1:100, and wherein the total level of said thickening surfactant system is no more than about 20% by weight.

2. A composition according to claim 1 wherein said composition comprises from about 0.006% to about 0.015% by weight of the total composition of α or β metal phthalocyanine dye, or mixtures thereof.

3. A composition according to claim 1 wherein said composition comprises from about 0.006% to about 0.012% by weight of the total composition of α or β metal phthalocyanine dye, or mixtures thereof.

4. A composition according to claim 1 wherein said source of peroxygen is a persulfate salt, and said composition comprising up to about 30% by weight of the total composition of said source of peroxygen, or mixtures thereof.

5. A composition according to claim 1 wherein said source of peroxygen is a monopersulfate, and said composition comprising from about 0.1% to about 20% by weight of the total composition of said source of peroxygen, or mixtures thereof.

6. A composition according to claim 1 wherein said composition has a pH of from about 0 to about 6.

7. A composition according to claim 1 wherein said composition has a pH of from about 0 to about 4.

8. A composition according to claim 1 wherein said composition has a viscosity of from about 250 cps to about 1500 cps at about 20° C., when measured with a Carri-med rheometer at about 50 dyne/cm2.

9. A composition according to claim 1 wherein said composition has a viscosity of from about 250 cps to about 900 cps at about 20° C., when measured with a Carri-med rheometer at about 50 dyne/cm2.

10. A process of treating hard-surfaces, wherein a composition according to claim 1 is applied to the said hard-surface.

11. A composition according to claim 1 wherein said α or β metal phthalocyanine dye has the following formula:

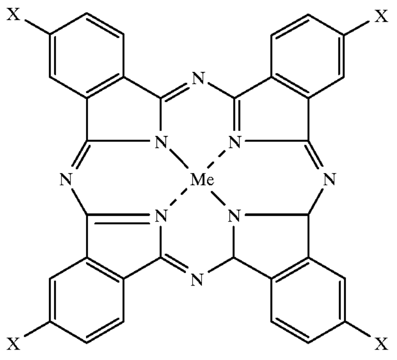

where the substituent X is one of the following groups H, Cl, $HSO_3$, COO—M+, Br, $NO_2$, $OCH_3$ or a $C_1$ to $C_{10}$ alkyl group and where Me is copper, chromium, vanadium, magnesium, nickel, platinum, aluminium, cobalt, lead, barium or zinc.

12. A composition according to claim 11 where Me is copper.

13. A composition according to claim 1 wherein said composition comprises a thickening surfactant system comprising (a) a quaternary ammonium compound wherein one or two of the hydrocarbon groups linked to nitrogen are a linear or branched alkyl group of about 10 to about 25 carbon atoms, saturated or unsaturated, and wherein the other hydrocarbon groups linked to the nitrogen are independently substituted or unsubstituted, linear or branched alkyl chain of from 1 to about 3 carbon atoms and wherein the counterion used in said quaternary ammonium compound is selected from the group of fluoride, or methyl sulfate, or methylsulfonate or hydroxide, or mixtures thereof, and (b) an amine oxide having the following formula $R_1$ $R_2R_3NO$ wherein $R_2$ and $R_3$ are independently alkyl groups of from about 1 to about 3 carbon atoms, and wherein $R_1$ is a C8 to C10 alkyl group, or mixtures thereof.

14. A composition according to claim 13 wherein in said composition the weight ratio of said amine oxide to said quaternary ammonium compound is from about 1:4 to about 1:30, and wherein the total level of said thickening surfactant system is between about 1% to about 10%.

* * * * *